Jan. 5, 1932.   C. B. SPALSBURY ET AL   1,839,445
LASTING MACHINE
Filed Dec. 22, 1927   3 Sheets-Sheet 2
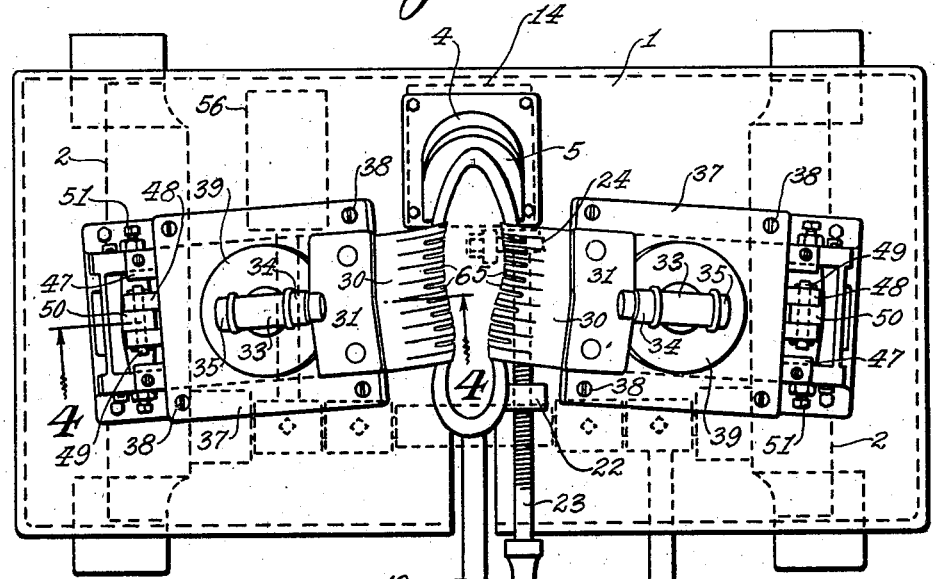
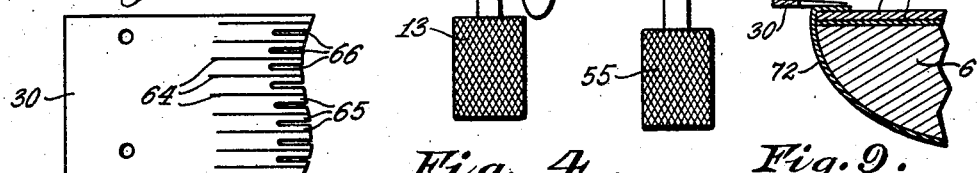
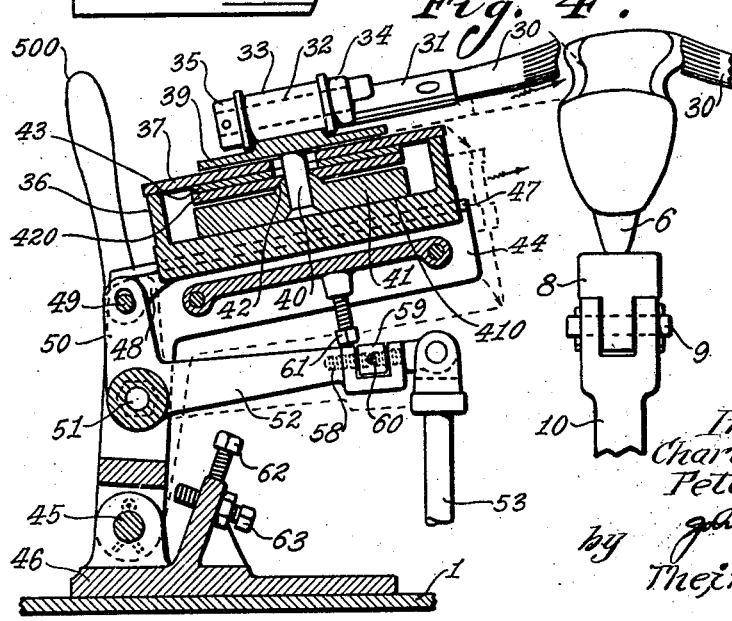
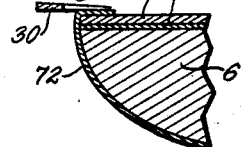
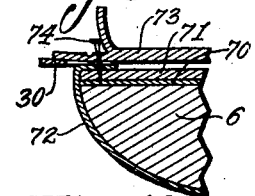
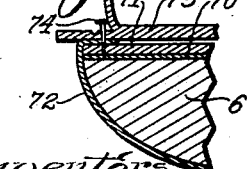

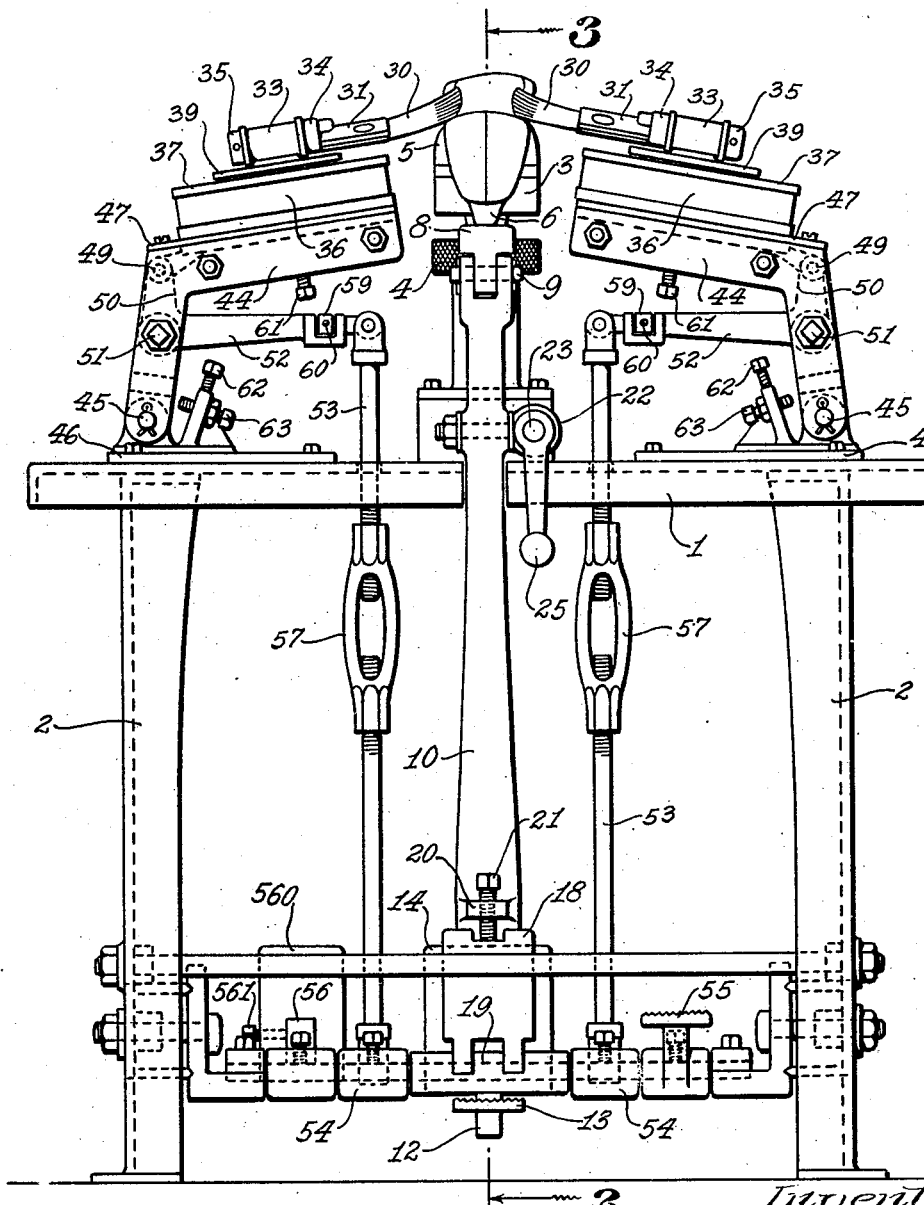

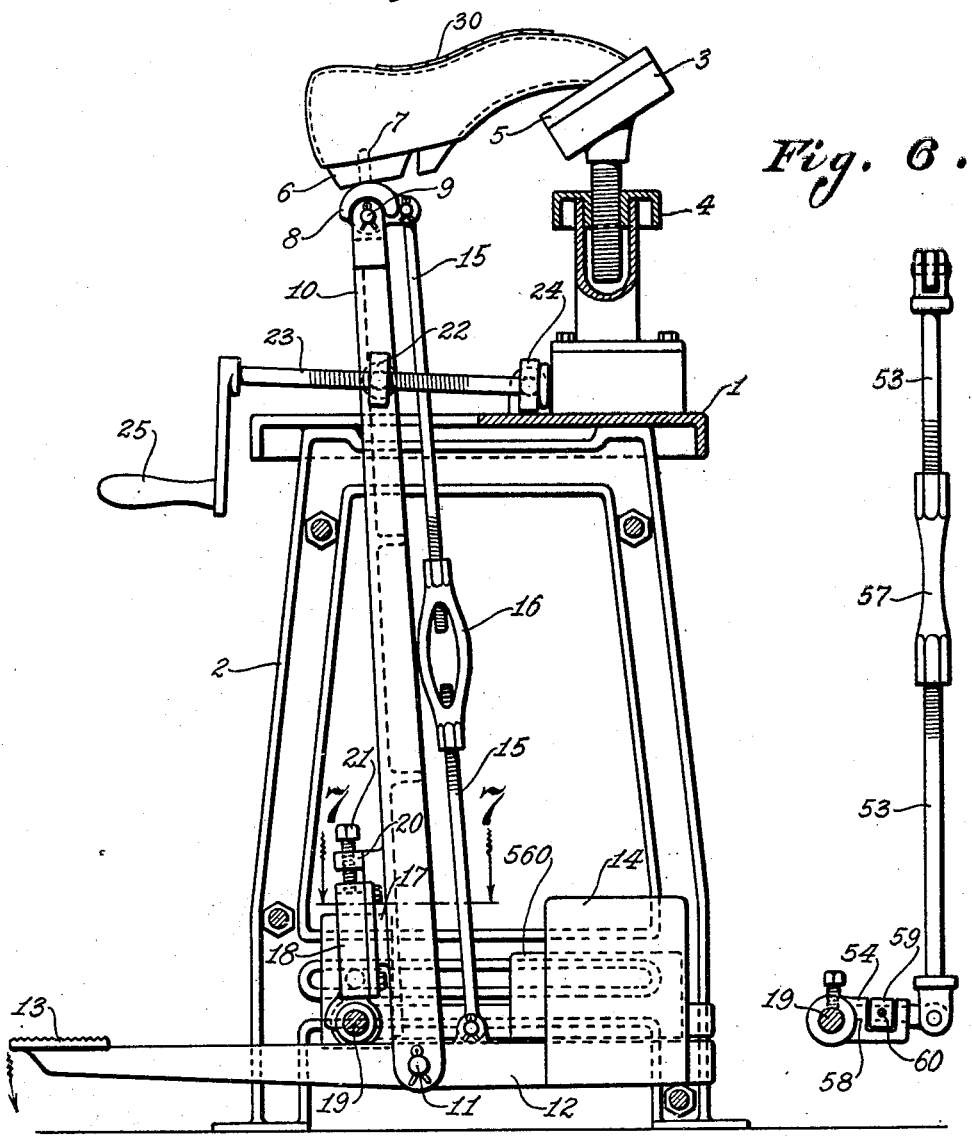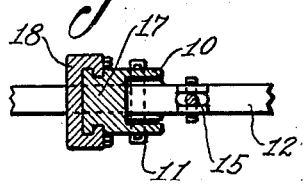

Patented Jan. 5, 1932

1,839,445

UNITED STATES PATENT OFFICE

CHARLES B. SPALSBURY AND PETER MATTLER, OF ST. LOUIS, MISSOURI, ASSIGNORS TO JOHNSON, STEPHENS & SHINKLE SHOE COMPANY, OF ST. LOUIS, MISSOURI, A CORPORATION OF MISSOURI

LASTING MACHINE

Application filed December 22, 1927. Serial No. 241,801.

This invention relates to lasting machines, and more particularly to machines of the type employing wipers in order to wipe the upper over the last, although as to certain features the invention is applicable to machines employing other lasting elements.

In lasting machines of the character referred to, the lasting element is usually confined in its movement as by being mounted in guides. In order to secure adjustment of the lasting element to the last and the upper thereon, it is, therefore, necessary to provide adjusting devices in the nature of screws or the like which must be manipulated in order to secure such adjustment. Since, however, the required adjustment is such as to necessitate movements about various axes, each of which must have its adjusting devices or screw, the number of adjusting devices is comparatively large so that a good deal of time is taken up by the operator in making these adjustments, while the machine is unduly complicated.

One of the objects of this invention, therefore, is to provide a machine of the general character referred to in which the lasting elements are so mounted as to be free for adjustment in order to conform to the upper on the last.

Another object is to provide a machine in which the lasting element is automatically locked in adjusted position when engaged with the upper so that the element can then be moved over the last in order to place the upper under tension and in conformity to the last.

Another object is to provide a machine in which the lasting elements are not confined, but are arranged for free adjustment in such a manner that they can be shifted to any desired position as required by the conformation and position of the last.

Another object is to provide a machine in which the lasting elements are so mounted, arranged and controlled that they may not only be freely adjusted by the operator, but after being so adjusted will be locked upon engagement of these elements with the upper, and will then be actuated to move over the last in order to conform the upper thereto.

Another object is to provide a machine of the general character referred to in which both sides of the shoe can be lasted in one operation, if desired.

Another object is to provide a lasting machine which is simple in construction and operation, effective in its action and economical to manufacture and maintain.

Further objects will appear from the detail description taken in connection with the accompanying drawings, in which:

Fig. 1 is a front elevation of a lasting machine embodying this invention;

Fig. 2 is a plan view;

Fig. 3 is a section on the line 3—3, Fig. 1, parts being shown in elevation;

Fig. 4 is a section on line 4—4, Fig. 2, parts being shown in elevation;

Fig. 5 is a detail of one of the wipers;

Fig. 6 is a detail showing the connection from the treadle to the wiper actuating means;

Fig. 7 is a section on the line 7—7, Fig. 3; and

Fig. 8, Fig. 9 and Fig. 10 are views somewhat diagrammatical in form showing the lasting and tacking operations.

Generally stated, in accordance with one embodiment of this invention, the lasting machine has lasting elements in the form of wipers arranged on opposite sides of the last. Each element is mounted for free adjustment on a carrier in order to conform to the upper on the last and means is provided for locking this element to its carrier. This carrier is mounted for movement on a support towards and from the last so as to wipe the upper thereover. This support is in turn pivoted so as to permit the same to swing about an axis located therebelow and adjacent its outer end so as to cause the tip of the wiper to move in an arc when it is placed on the last and the upper thereon.

In accordance with one embodiment of this invention the wiper is swiveled on a holder which in turn is arranged to not only slide horizontally over the carrier but also pivot about a vertical axis. Accordingly, the wiper can be slid towards and from the last as well as angularly, in order to conform the edge of the wiper to the upper and the last. Means are, however, provided so that when the wiper is placed on the upper in adjusted position, the holder will become clutched to the carrier. Accordingly, upon inward movement of the carrier, the wiper will be carried with it in order to wipe the upper over the last. The support is swung about its pivot by the action of gravity, although other means may be used and in the particular embodiment illustrated, a treadle is provided for swinging the support upwardly while a weight swings the carrier down, in order to press the wiper yieldingly but firmly on the upper and the last, and this pressure may be varied by shifting of the weight. The weight also operates to move the carrier and the wiper thereon over the last in order to secure a yielding wiping of the upper thereover, while upon raising of the treadle the wiper is released for retraction. The mechanisms are duplicated on opposite sides of the last and a single treadle and weight may be employed for securing simultaneous operation of the wipers.

Referring now to the accompanying drawings, 1 designates a frame which is mounted on suitable legs 2. The frame has mounted thereon a jack of any suitable and usual construction comprising a toe support 3 adjustable by a nut 4 and provided with a facing 5 of yielding material such as rubber, in order to support the toe of the last 6. A pin 7 entering the last is mounted on a holder 8 pivoted at 9 on a standard 10, in turn pivoted at 11 to a treadle 12, having a foot piece 13 and carrying at its right end, Fig. 3, a weight 14. A link 15 is pivoted to the treadle 12 and the holder 8 and is adjustable by a turnbuckle 16. The standard 10 has a slide 17 moving in a guide 18 swiveled on a shaft 19 mounted in bearings on the frame 1 and this slide 17 has an overhanging lug 20 provided with a set screw 21 arranged to engage the top of the guide 18. The standard 10 further has a swiveled nut 22 with which engages a threaded shaft 23 thrust journalled in a bearing 24 on the frame 1 and provided with a handle 25.

The operation of the jack so far described will be obvious from the above. The weight 14 actuating the link 15 and the holder 8, through the treadle 12, serves to hold the toe of the last on the toe support 3. The height of this toe support may be adjusted by the nut 4. The height of the heel of the last may be varied by adjustment of the set screw 21. By depressing the treadle the latter is swung about 11 as a pivot so as to raise the toe of the last and permit the latter to be removed or replaced. The standard may be moved towards and from the toe support by adjustment of the handle 25. It will, of course, be understood that any other jack of suitable construction may be provided.

Arranged to cooperate with the last are a pair of lasting elements or wipers and associated mechanism, and since these wipers and mechanism are duplicated on opposite sides of the last, a detailed description of one will be sufficient. A wiper 30, (more fully hereinafter described) is suitably secured in a part 31 which has a shank 32 swiveled in a holder 33, in order to move about an axis along the wiper. A head 34 and a nut 35 limit axial movement of the wiper in the holder. The wiper as a whole and its holder are mounted in a carrier 36 having a top plate 37 secured thereto in any suitable manner, as by screws 38, and the bottom face of this plate is machined to provide a bearing surface. The holder 33 has a cover plate 39, which is spaced from the top face of plate 37. The holder 33 has a stem 40 passing through an enlarged hole in the top plate 37 and provided with a head 41 which may be secured to the stem 40 in any suitable manner as by peening over the lower end of the stem. The top face of the head 41 is rounded so as to form a part of a ball 42 arranged to enter a socket in a disk 420; the latter may be provided with a facing 43 of leather or any suitable friction material, adapted to bear against the under face of the top plate 37. The bottom face of the head 41 is machined so as to slide on a machined face 410 in the carrier. It will thus be seen that the wiper is mounted on the carrier for relative movement, not only about an axis 32 along the wiper but also about the vertical axis 40, as well as free sliding movement on the carrier.

The carrier is mounted to slide towards and from the last on a support 44 pivoted at 45 on a bracket 46 mounted on the frame 1; the carrier being provided with guides cooperating with ribs 47 on the support. The carrier has lugs 48 connected by a pin 49 entering a slot on the arm 50 of a bell crank lever pivoted at 51 on the support 44. The other arm 52 of the bell crank lever is connected by a link 53 with an arm 54 fixed to the shaft 19. This shaft 19 has also fixed thereto a forwardly projecting treadle 55 and a rearwardly projecting arm 56 on which is mounted a weight 560 which can be slid therealong and secured by a set screw 561. The length of each link 53 can be adjusted by a turnbuckle 57. The ends of each link 53 are swiveled in the arms 52 and 54 by shanks 58 retained by nuts 59 secured by screws 60, Figs. 1 and 6. The arm 52 is arranged to engage a stop screw 61 on the support 44 and a stop screw 62 on the bracket 46. The support 44 is arranged to engage a stop screw 63 in the bracket 46. If desired, the arm 50 may be extended so as to form an operating lever 500 as shown in Fig. 4.

As shown each wiper 30 comprises a plate which conforms to the bottom of the last as well as to the general outline of the sole bottom. This plate is cut as shown at 64 to provide a series of fingers 65; each of these fingers is slotted as shown at 66. The plate is preferably of spring steel so that the fingers can yield to a certain extent and the ends of the fingers are slightly rounded in order to readily wipe the upper over the insole on the last. These wipers are so constructed and arranged as to lie close to the last bottom and the upper thereon when moved thereover in order to permit placement thereover and tacking thereto of the sole. It will be noted that these wipers are so formed and extend along the last sufficiently as to comprehend the shank as well as the ball of the shoe in order to last substantially the entire forepart of the shoe during one operation.

The operation of lasting and tacking will be readily understood by reference to the drawings, and particularly to Figs. 8, 9 and 10. The last 6 may be provided with a metallic bottom 70; an insole 71 of any suitable or usual form may be laid thereover and the upper 72 may be assembled in the usual way. This upper is then wiped over the last and more particularly over the insole. To accomplish this, the operator first depresses the treadle 55 thereby raising the supports and carriers through the arms 52 engaging screws 61, while arm 50 slides the carriers with the wipers thereon away from the last as shown in Fig. 4; the wipers can also be slid inwardly to their full limit on their carriers as the shank 40 travels in the hole in the top plate 37. The operator can now position the wiper tips by hand against the upper so as to preliminarily fold the same over the last bottom while turning up the edges of the upper with his fingers in order that the wipers may take a hold. The treadle is then released thereby causing the weight of the carriers and supports, together with the weight 560, to swing the supports downwardly about the pivots 45 in order to hold and press the wipers firmly on the upper and on the last. When the wipers are thus held and pressed down on the upper, the frictional connections between the wiper holders and the carriers come into play so as to clutch or lock the wipers to their carriers; accordingly, as the weight 560 continues to act the wipers will be moved yieldingly inwardly in order to yieldingly but firmly wipe the upper over the last while the upper margins are pressed down, in order to closely conform the upper to the last. It will also be noted that the wipers can accommodate themselves to the bottom of the last, by not only permitting swiveling about the axis 32 along the wiper, but also by permitting lateral movement about the vertical axis 40.

At the conclusion of the wiping operation, the parts will occupy the positions shown in Figs. 2 and 8, with the wipers over the upper and with the latter wiped to conform closely to the last. An outsole 73 is now placed on the wipers and temporary lasting tacks 74 driven through the outsole, upper and preferably into the insole; this is possible because the slots 66 in the wipers permit the tacks to pass therethrough. After the tacks are driven and while the upper is firmly held under tension due to the wipers, the treadle 55 is depressed slightly, so as to release the pressure of the wipers on the last; this causes the upper holders to become unclutched from their carriers so that the wipers can be slid back; the treadle can then be released permitting the supports to drop until arrested by the screws 61, 62 and 63.

It will, therefore, be seen that this invention accomplishes its objects. A lasting machine is provided whereby the lasting operations may be performed in a simple and effective manner. By mounting the wipers for free adjustment on their carriers these wipers may be positioned so as to conform to the last and after such adjustment may be locked to their carriers so that the upper can be wiped over the last so as to closely conform thereto. By mounting the carriers on supports arranged for vertical movement, not only can these wipers be readily moved to position, but the frictional connection comes into play automatically. On the whole the construction is such that substantially the entire forepart and shank of the shoe may not only be lasted properly and expeditiously but the sole may be readily tacked to the lasted upper.

While there is described a machine adaptable for operation on a specific type of shoe, it will be understood that the same is merely illustrative of one embodiment of this invention; for this invention is applicable for the lasting of other types of shoes. It will, furthermore, be understood that some of the features, mechanisms, and sub-combinations are of utility and may be employed without reference to other features, mechanisms and subcombinations: that is contemplated by and is within the scope of the appended claims. It is further obvious that various changes may be made in details of construction, within the scope of the appended claims, without departing from the spirit of this invention. It is, therefore, to be understood that this invention is not to be limited to the details shown and described.

Having thus described the invention, what is claimed is:

1. In a lasting machine having a jack for a last, a carrier, a lasting element mounted for free adjustment on said carrier in order to conform to the upper on the last, and means operating upon movement of said carrier for locking said element to said carrier.

2. In a lasting machine having a jack for a last, a carrier, a lasting element mounted for free adjustment on said carrier in order to conform to the upper on the last, means for moving said carrier and last relatively to engage said element with the upper, and means adapted upon such engagement to lock said element to said carrier.

3. In a lasting machine having a jack for a last, a carrier, a lasting element mounted for free adjustment on said carrier in order to conform to the upper on the last, means for moving said carrier adapted to move said element over the last, and means operating upon such movement for locking said element to said carrier.

4. In a lasting machine having a jack for a last, a carrier, a lasting element mounted for free adjustment horizontally on said carrier, means for mounting said carrier to move vertically, and means operating upon movement of said carrier for locking said element to said carrier.

5. In a lasting machine having a jack for a last, a carrier, a lasting element mounted for free adjustment about a vertical axis on said carrier, means for mounting said carrier to move vertically, and means operating upon movement of said carrier for locking said element to said carrier.

6. In a lasting machine having a jack for a last, a carrier, a lasting element mounted to slide freely on said carrier towards and from the last, means for mounting said carrier to move vertically, and means operating upon movement of said carrier for locking said element to said carrier.

7. In a lasting machine having a jack for a last, a carrier, a lasting element mounted to slide freely on said carrier towards and from the last, and swing about a vertical axis, means for mounting said carrier to move vertically, and means operating upon movement of said carrier for locking said element to said carrier.

8. In a lasting machine having a jack for a last, a carrier, a lasting element mounted to slide freely on said carrier, and means operating upon movement of said carrier and last relatively adapted to clutch said element to said carrier.

9. In a lasting machine having a jack for a last, a carrier, a lasting element mounted to slide freely on said carrier, means operating upon movement of said carrier and last relatively adapted to clutch said element to said carrier, and means for moving said carrier adapted to move said element over the last.

10. In a lasting machine having a jack for a last, a carrier, a holder mounted for free adjustment on said carrier, a lasting element mounted for free adjustment in said holder, and means operating upon movement of said carrier and last relatively adapted to lock said holder to said carrier.

11. In a lasting machine having a jack for a last, a carrier, a holder mounted to slide freely on said carrier, a lasting element swiveled on said holder, and means operating upon movement of said carrier and last relatively adapted to lock said holder to said carrier.

12. In a lasting machine having a jack for a last, a carrier, a holder mounted to slide freely on said carrier, a lasting element swiveled on said holder, means operating upon movement of said carrier and last relatively adapted to lock said holder to said carrier, and means for moving said carrier adapted to move said element over the last.

13. In a lasting machine having a jack for a last, a carrier, a side lasting element mounted for free adjustment thereon in order that it may be shifted bodily along the last, means for mounting said carrier adapted to permit said element to be placed on the last, and means for retaining said element on said carrier and for thereafter moving said carrier adapted to move said element over the last.

14. In a lasting machine having a jack for a last, a carrier, a side lasting element thereon for free adjustment in order that it may be shifted bodily along the last, means for pivoting said carrier adapted to permit said element to be placed on the last, and means for retaining said element on said carrier and for thereafter moving said carrier adapted to move said element over the last.

15. In a lasting machine having a jack for a last, a carrier, a side lasting element thereon for free adjustment in order that it may be shifted bodily along the last, means for pivoting said carrier adapted to permit said element to be placed on the last, and means for retaining said element on said carrier and for moving said carrier to press said element on the last and to thereafter move the same over the last.

16. In a lasting machine having a jack for a last, a carrier, a side lasting element mounted for free adjustment thereon in order that it may be shifted bodily along the last, means for pivoting said carrier adapted to permit said element to be placed on the last, and means for retaining said element on said carrier and for thereafter moving said carrier adapted to move said element over the last.

17. In a lasting machine having a jack for a last, a support, a carrier thereon, a side lasting element mounted for free adjustment on said carrier in order that it may be shifted bodily along the last, means for swinging said support vertically to place said element on the last, and means for retaining said element on said carrier and for thereafter sliding said carrier horizontally on said support.

18. In a lasting machine having a jack for a last, a support, a carrier thereon, a side lasting element slidable freely on said carrier in order that it may be shifted along the last, means for swinging said support vertically to place said element on the last, and means for retaining said element on said carrier and for thereafter sliding said carrier horizontally on said support.

19. In a lasting machine having a jack for a last, a support, a carrier thereon, a side lasting element mounted for free adjustment on said carrier in order that it may be shifted bodily along the last, means for pivoting said support therebelow adapted to cause said element to move in an arc to place said element on the last, and means for retaining said element on said carrier and for thereafter sliding said carrier on said support.

20. In a lasting machine having a jack for a last, a support, a carrier thereon movable towards the last, a side lasting element mounted for free adjustment on said carrier in order that it may be shifted along the last, means for raising said support to permit placing said element on the last, and means operating upon release of said raising means adapted to move said carrier towards the last in order to cause said element to move with said carrier to engage the upper and move it over the last.

21. In a lasting machine having a jack for a last, a support, a carrier thereon movable towards and from the last, a side lasting element mounted for free adjustment on said carrier in order that it may be shifted along the last, means for raising said support and retracting said carrier, and means operating upon release of said raising and retracting means to cause said support to drop until the weight thereof is supported by the last and to move said carrier towards the last, said element engaging the upper to move it over the last.

22. In a lasting machine having a jack for a last, a support, a lasting element thereon and extending inwardly towards the last, means for pivoting said support therebelow and adjacent its outer end, means for swinging said support upwardly about its pivot, and a weight for moving said support down.

23. In a lasting machine having a jack for a last, a support, a carrier movable thereon towards and from the last, a side lasting element freely movable on said carrier and extending inwardly towards the last to place said element on the last, means for pivoting said support therebelow and adjacent its outer end so as to swing vertically, and means for retaining said lasting element on said carrier and for moving said carrier adapted to move said element over the last.

24. In a lasting machine having a jack for a last, a support, a carrier movable thereon towards and from the last, a lasting element freely movable on said carrier and extending inwardly towards the last, means for pivoting said support therebelow and adjacent its outer end so as to swing vertically, and means operating upon such swinging movement adapted to lock said element to said carrier.

25. In a lasting machine having a jack for a last, a support arranged on each side of the last, a lasting element on each support and extending towards the last, means for pivoting each support therebelow and adjacent its outer end on a long radius laterally of the last, and means for swinging said supports vertically in unison.

26. In a lasting machine having a jack for a last, a support arranged on each side of the last, a carrier movable on each support towards and from the last, a lasting element on each support and extending towards the last, means for pivoting each support therebelow and adjacent to its outer end on a long radius laterally of the last, means for swinging said supports vertically in unison, and means for moving said carriers in unison.

In testimony whereof I affix my signature this 14th day of October, 1927.

CHARLES B. SPALSBURY.

In testimony hereof I affix my signature this 14th day of October, 1927.

PETER MATTLER.